United States Patent

[11] 3,609,120

[72] Inventors Peter Albert Theodore Hoye
Stourbridge;
Donald Albert Wood, Quinton,
Birmingham, both of England
[21] Appl. No. 801,825
[22] Filed Feb. 24, 1969
[45] Patented Sept. 28, 1971
[73] Assignee Albright & Wilson, Limited
Oldbury near Birmingham, England

[54] NOVEL CHEMICAL COMPOUNDS AND STABILIZED HALOGEN-CONTAINING RESINS
8 Claims, No Drawings

[52] U.S. Cl. .................................................. 260/45.75, 260/429.7
[51] Int. Cl. ...................................................... C08f 45/62
[50] Field of Search............................................ 260/45.75 K

[56] References Cited
UNITED STATES PATENTS
3,398,114 8/1968 Pollock .................. 260/45.75

*Primary Examiner*—Donald E. Czaja
*Assistant Examiner*—J. P. Hoke
*Attorneys*—Lewis C. Brown, Kenneth G. Wheeles and Robert P. Grindle ABSTRACT: This invention is one of novel compounds of the formula

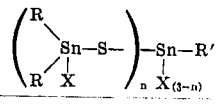

wherein R and R' are hydrocarbons, X is an organic radical such as a hydrocarbon bonded to a tin atom through a sulfur atom and $n$ is an integer of less than 4, and of halogen-containing polymers stabilized against the deteriorative effects of heat by the presence therein of said novel compounds.

NOVEL CHEMICAL COMPOUNDS AND STABILIZED HALOGEN-CONTAINING RESINS

The present invention relates to novel sulfur containing organotin compounds which find use as stabilizers for halogen-containing resins, particularly polymers or copolymers of vinyl chloride and vinylidene chloride.

The invention is based on our discovery that a diorganotin sulfide of the formula $R_2SnS$ wherein R is a hydrocarbon group or substituted hydrocarbon group will react with a mono-organotin compound of the formula $R'SnX_3$, wherein R' is a hydrocarbon group or substituted hydrocarbon group and each X is an electronegative group bonded to the tin atom through a sulfur atom, to form a stannthiane.

We have found that the particular stannthiane produced depends upon the relative proportions of the diorganotin sulfide and the mono-organotin compound of the formula $R'SnX_3$ employed. Thus if equimolar proportions are used a distannthiane is formed having the formula:

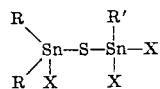

if a 1:2 molar ratio of $R'SnX_3$ to $R_2SnS$ is employed the product will be a compound having the formula:

0001

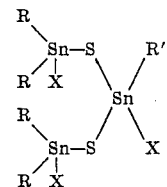

and if a 1:3 molar ratio of $R'SnX_3$ to $R_2SnS$ is employed the product will be a compound having the formula:

0002

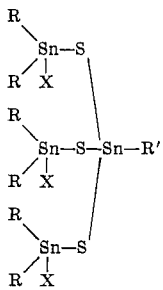

Should intermediate molar ratios be employed then a mixture of products will result. It is not believed that such mercapto substituted stannthianes have previously been described.

Accordingly, from one aspect the present invention provides stannthianes of the general formula:

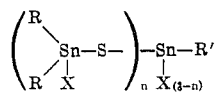

wherein each R is a hydrocarbon or substituted hydrocarbon group or the two R groups, together with the tin atom may make up a five or six membered hetrocyclic ring or R is a polyvalent hydrocarbon radical in a polymeric chain composed of recurring (—R —Sn —R —) groups, R' is a hydrocarbon or substituted hydrocarbon group; each X is an electro negative group bonded to the tin by a sulfur atom, and n is an integer from 1 to 3.

From another aspect the invention provides a process for the preparation of the stannthianes of the invention which comprises either reacting a diorganotin sulfide $[R_2SnS]$ with an organotin compound of the general formula $R'SnX_3$, or a two-stage process wherein a diorganotin sulfide $[R_2SnS]$ is reacted with a compound of the formula $R'SnZ_3$, wherein Z is an electro negative group such as a chloride or bromide, and the product of this reaction is reacted with a mercapto compound of the formula XH.

Organotin sulfides of the formula $R_2SnS$ which may be used for preparing compounds according to the invention are those in which each R is hydrocarbon group, or a substituted hydrocarbon group in which the substituent group is inert and the two R groups may be the same or different. Suitable groups which may be bonded to the tin atom in the organotin sulfide and alkyl groups such as methyl, ethyl, propyl, butyl or octyl groups; aryl groups such as phenyl, tolyl and xylyl groups; cycloalkyl groups such as cyclohexyl or aralkyl groups such as benzyl. Preferred organotin sulfides for use in the process of the invention are dibutyltin sulfide, di-n-octyltin sulfide, di-2-ethylhexyltin sulfide, dicyclohexyltin sulfide and diphenyltin sulfide.

Organotin compounds of the formula $R'SnX_3$ which may be used in processes according to the invention are those in which R', which may be the same as R or different is an alkyl group having from 1–16 carbon atoms, cycloalkyl, aralkyl or aryl group and may contain an inert substituent which will not cause donation or withdrawal of electrons from the tin atom and X is an electro negative group bonded to the tin atom by a sulfur-tin bond, and each X may be the same or different. Particularly suitable R' groups include n-butyl groups, n-octyl groups, 2-ethylhexyl groups, iso-octyl groups, cyclohexyl groups and phenyl groups. The electro negative X group contains a sulfur atom which bonds to the tin atom and suitable groups include mercaptide groups such as the ethyl mercaptol and thiosorbitol residues or aryl mercaptol residues such as thiophenol, and thionaphthol residues and thiocarboxylic acid residues such as those derived from thiobenzoic acid. Particularly preferred, however, are the residues of mercapto-substituted carboxylic acid esters in particular of thioglycolate esters, β-mercaptopropionate esters, and mercapto maleate esters.

Suitable compounds of the formula $RSnX_3$ which may be used in the process of the invention include n-butyltin tristhiophenolate, cyclohexyltin tristhiophenolate, cyclohexyltin trisiso-octyl thioglycolate, n-butyltin trisdecylthioglycolate, octyltin trisnoylthioglycolate, cyclohexyltin trisiso-octylthioglycolate, phenyltin trislaurylthioglycolate, and n-butyltin trishexylthioglycolate. Especially preferred, however, are n-butyltin trisiso-octylthioglycolate, octyltin trisiso-octylthioglycolate, phenyltin trisiso-octylthioglycolate, n-butyltin trisiso-octylthioglycolate, n-butyltin trisiso-octyl β-mercaptopropionate, and octyltin trisiso-octyl β-mercaptopropionate.

The process of the invention may be carried out merely by mixing the two reactants, preferably in stoichiometric trisiso-octylthioglycolate, and heating if necessary. Preferably, however, the process is carried out in the presence of a solvent for the organotin compound of formula $RSnX_3$ which is inert to the reactants and product. Such a solvent is normally a hydrocarbon, a ketone or an ether. For example hexane, benzene, toluene, xylene, acetone, diethyl ether, dibutyl ether or tetrahydrofuran may be used, In order to reduce the length of time taken to bring the reaction to completion it may be found convenient to warm the reaction mixture, for example, to between about 40° C. and 80° C. for a short period. The desired product may then be obtained by distilling off the solvent.

Compounds according to the invention find use as stabilizers for compositions comprising polymers or copolymers of vinyl chloride or vinylidene chloride, chlorinated vinyl chloride polymers, and chlorinated polyethylene. While it will often be convenient to add the preformed compound to the polymeric resin, it may be desired to add the reactants to the resin and allow them to react in situ in the resin formulation. If this is done it may be desirable for certain applications to include an excess of either of the reactants over the amount required to form the desired reaction product in the polymeric composition.

Accordingly, from a further aspect, the present invention provides a composition which comprises a polymer or copolymer of vinyl chloride or vinylidene chloride, a chlorinated polymer of vinyl chloride or chlorinated polyethylene, and as a stabilizer therefor a mixture of, or the reaction product of, a compound of the formula R'SnX$_3$ with a compound of the formula R$_2$SnS wherein R, R' and X are as hereinbefore defined.

If it should be desired to form the stannthianes of the invention in situ in the polymeric composition this may be accomplished by adding the reactants to particles of the desired resin prior to milling.

Specific combinations of compounds which are of use in compositions according to the invention, either in admixture or as the reaction products are: mono-n-butyltin trisiso-octyl thioglycolate and di-n-butyltin sulfide, believed to react to form 1,1,3-tri-n-butyl-1,3,3-tris-iso-octylthioglycolate 1,3-distann-2-thiane; mono-octyltin trisico-octylthioglycolate and dioctyltin sulfide believed to react to form 1,1,3-trisiso-octylthioglycolate 1,3-distann-2-thiane; phenyltin trisiso-octylthioglycolate and dibutyltin sulfide believed to react to form 1,1-dibutyl-3-phenyl-1,3,3-tris-iso-octylthioglycolate-1,3-distann-2-thiane; mono-n-butyltin trisiso-octylthioglycolate and dioctyltin sulfide reacting to form 1,1-dioctyl-3-n-butyl-1,3,3-tris-iso-octylthioglycolate-1,3-distann-2-thiane.

Other useful combinations include mono-cyclohexyltin trisiso-octylthioglycolate and dibutyltin sulfide; n-butyltin tris-laurylthioglycolate and dibutyltin sulfide; octyltin tris-laurylthioglycolate and diocthyltin sulfide; mono-cyclohexyl-tin trisiso-octylthioglycolate and dioctyltin sulfide; phenyltin tris-laurylthioglycolate and dibutyltin sulfide; and n-butyltin tris-hexylthioglycolate and dibutyltin sulfide, mono-n-butyltin trisiso-octyl β-mercaptopropionate and dibutyltin sulfide; and n-butyltin tris-hexylthioglycolate and dibutyltin sulfide, mono-n-butyltin trisiso-octyl β-mercaptopropionate and dibutyltin sulfide.

The combination of organotin compounds will be present in compositions according to the invention in amounts from 2 percent to 3 percent by weight bases on the total amount of polymeric resin present.

Optionally, but advantageously, compositions according to the in invention also contain hindered phenols, that is those having at least one substituent in a position ortho to the hydroxyl group. Such phenols which are of use in compositions of the present invention include butylated hydroxyanisol, 2,6-di-tert-butylphenol, methylene bis(2,4-di-tert-butylphenol), methylene bis(2,6-di-tert-butylphenol), methylene bis(2,6-di-tert-butyl-3-methylphenol), 4,4'-butylidene-bis(6-tert-butyl-3-methylphenol), methylene bis(4-ethyl-6-tert-butylphenol), methylene bis(4-methyl-di-tert-butylphenol). preferred, however, is 2,6-di-tert-butyl-4-methylphenol. Such phenols may be present in an amount of up to 3 percent, preferably from 0.01 percent to 0.5 percent by weight of the resin and will normally be present as about 4–10 percent by weight, preferably 5–8 percent, based on the total amount of organotin compounds used.

Organotin formulations as described above, optionally including a hindered phenol, will often be used as the only stabilizer in a polymeric vinyl often be used as the only stabilizer in a polymeric vinyl chloride or vinylidene chloride composition. However, if desired conventional thermal stabilizers may also be included. These may include, for example, metal soap stabilizers such as cadmium, barium or zinc salts of fatty acids, or lead salts such as lead carbonate or stearate or dibasic lead phosphate or phthalate, tribasic lead sulfate or conventional organotin stabilizers such as dibutyltin dilaurate or dibutyltin maleate or sulfur-containing compounds such as dibutyltin bis-thioglycolates.

In the practice of the invention the stabilizer formulation may be mixed with the halogen-containing resin in the conventional manner, for example, by milling with the resin on heated rolls at about 150° C., although higher temperatures may be used when convenient, or by being mixed with particles of the polymer and then melting and extruding the mixture or by adding the stabilizer to a liquid resin.

Resins which may be used in compositions according to the invention normally contain at least 40 percent by weight of chlorine. Usually it will be polymer or copolymer of vinyl chloride or vinylidene chloride but post-halogenated polyvinyl chloride or post-halogenated polyolefins, may be employed if desired. Suitable monomers which may form such copolymers with vinyl chloride and vinylidene chloride include, for example, acrylonitrile, vinyl acetate, methyl methacrylate, diester of fumaric acid, and maleic acid, ethylene, propylene, and lauryl vinyl ether and these co-monomers may be present in an amount of up to 25 percent of the total weight of monomers copolymerized.

The organotin stabilizer formulation may be employed in either plasticized resin compositions, for example, those plasticized with carboxy ester plasticizers or may be employed in unplasticized, that is rigid, compositions.

The process of the invention will be illustrated by the following examples:

EXAMPLE 1

A mixture of dibutyltin sulfide (40 parts wt.) and mono-butyltin trisiso-octylthioglycolate (118 parts) was stirred and heated to 80° C. 2,6-di-tert-butyl-p-cresol (8 parts wt.) was added and the product was removed by filtration to give a clear almost colorless liquid (found: Sn 21.1 percent, S 10.3 percent).

EXAMPLE 2

A mixture of dioctyltin sulfide (37.7 parts wt.) and octyltin trisiso-octylthioglycolate (84.2 parts) were heated to 80° C. 2,6-di-tert-butyl-p-cresol (6 parts wt.) was added and the mixture stirred at 80° C. for 30 minutes and filtered.

EXAMPLE 3

A stabilizer was prepared from dibutyltin sulfide (25.6 parts wt.), mono-butyltin trisiso-octyl β-mercapto-propionate (83 parts) and 2,6-di-tert-butyl-p-cresol (5.8 parts wt.) as described in example 1.

EXAMPLE 4

A stabilizer was prepared from mono-butyltin trisiso-octylthioglycolate (78.5 parts wt.) dioctyltin sulfide (37.6 parts) and 2,6-di-tert-butyl-p-cresol (5.8 parts wt.) as described in example 1.

EXAMPLE 5

A stabilizer was prepared from dibyryltin sulfide (26.5 parts wt.) mono-phenyltin trisiso-octylthioglycolate (80.5 part and 2,6-di-tert-butyl-p-cresol (5.35 parts wt.) as described in example 1.

EXAMPLE 6

Use of stabilizers 1–5 in polyvinyl chloride.

The stabilizer (2 parts wt.) was milled at 150° C. for 10 minutes with 100 parts wt. of polyvinyl chloride (Corvic D55/9). Samples of the milled polyvinyl chloride hide were over aged at 200° C. in air. Colors of the oven aged sheet are indicated below in table I. The standard (control) test specimen contained 2 parts wt. of dibutyltin bis(isooctylthioglycolate) per 100 parts of the same polymer.

TABLE I.—COLOR OF DEGRADED PVC

| Compound | Time at 200° C./minutes | | | | | | |
|---|---|---|---|---|---|---|---|
| | Initial | 15 | 20 | 25 | 30 | 35 | 40 |
| Control | Colorless | Yellow | Yellow | Dark yellow | Orange | Dard red | Black. |
| Example 1 | do | Colorless | Colorless | Pale brown | Pale brown | Pale brown | Pale brown. |
| Example 2 | do | do | do | Pale yellow | Yellow | Yellow brown | Do. |
| Example 3 | do | do | do | Pale brown | Pale brown | Pale brown | Do. |
| Example 4 | do | do | do | Colorless | do | do | Do. |
| Example 5 | do | do | Pale brown | Brown | Greenish brown | Dark green | Black. |

EXAMPLE 7

Use of stabilizer—example 1 in polyvinyl chloride copolymers.

Polymer hides containing 2 parts wt. of the stabilizer were prepared in example 1 and, 2 parts wt. of dibutyltin bis(isooctylthioglycolate) were prepared as in example 6 using a commercial polymer Breon 202 (vinyl chloride + vinylidene chloride copolymer) and a commercial polymer Kureka HC825L (vinyl chloride + fumaric acid copolymer). Colors of the heat aged samples of the hides are indicated in table II.

TABLE II.—COLOR OF DEGRADED POLYMER

| Compound | Polymer | Time at 200° C/minutes | | | | | |
|---|---|---|---|---|---|---|---|
| | | Initial | 15 | 20 | 25 | 30 | 35 |
| Control | Breon 202 | Colorless | Pale yellow | Yellow | Dark yellow | Yellow brown | Red. |
| Example 1 | do | do | Colorless | Pale brown | Pale brown | Brown | Dark brown. |
| Control | Kureka HC825L | do | Pale yellow | Pale yellow | Yellow | Dark yellow | Orange. |
| Example 1 | do | do | do | do | Pale yellow | Pale yellow | Pale yellow. |

Although this invention has been illustrated by reference to specific embodiments, modifications thereof which are clearly within the scope of the invention will be apparent to those skilled in the art.

We claim:

1. A halogen-containing polymer selected from the group consisting of homopolymer and copolymers of vinyl chloride or vinylidene chloride, chlorinated polymers of vinyl chloride, and chlorinated polyethylene stabilized against the deteriorative effect of heat comprising said halogen-containing resin and a stabilizing amount of a compound of the formula

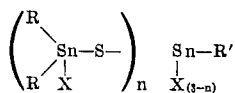

wherein R and R' are hydrocarbons, X is selected from the group consisting of alkyl mercaptol residues, aryl mercaptol residues, thiocarboxylic acid residues, and residues of mercapto substituted carboxylic acid esters bonded to said tin atom through a sulfur atom, and n is an integer of from 1 to 3

2. The halogen-containing polymer stabilized against the deteriorative effect of heat as claimed in claim 1 wherein said stabilizer is a compound of the formula

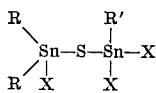

wherein R and R' are hydrocarbons and each X is selected from the group consisting of alkyl mercaptol residues, aryl mercaptol residues, thiocarboxylic acid residues, and residues of mercapto substituted carboxylic acid esters bonded to said tin atom through a sulfur atom.

3. The halogen-containing polymer stabilized against the deteriorative effect of heat as claimed in claim 1 wherein said stabilizer is a compound of the formula

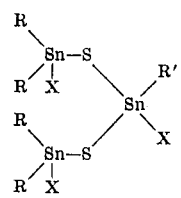

Awherein R and R' are hydrocarbons and each X is selected from the group consisting of alkyl mercaptol residues, aryl mercaptol residues, thiocarbonxylic acid residues, and residues of mercapto substituted carboxylic acid esters bonded to said tin atom through a sulfur atom.

4. The halogen-containing polymer stabilized against the deleterious effects of heat as claimed in claim 1 wherein said stabilizer is a compound of the formula

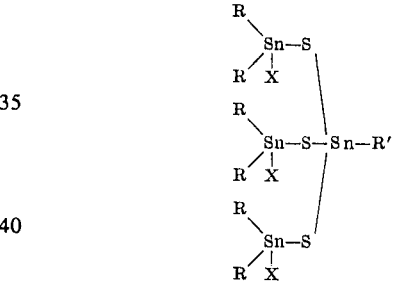

Awherein R and R' are hydrocarbons and each X is selected from the group consisting of alkyl mercaptol residues, aryl mercaptol residues, thiocarboxylic acid residues, and residues of mercapto substituted carboxylic acid esters, wherein each residue is bonded to a tin atom through a sulfur atom.

5. The halogen-containing polymer stabilized against the deteriorative effect of heat as claimed in claim 1 wherein said stabilizer is 1,1,3-trisiso-octylthioglycolate 1,3-distann-2-thiane.

6. The halogen-containing polymer stabilized against the deteriorative effect of heat as claimed in claim 1 wherein said stabilizer is 1,1-di-butyl-3-phenyl-1,3,3-trisiso-octyl-thioglycolate 1,3-distann-2-thiane.

7. The halogen-containing polymer stabilized against the deteriorative effect of heat as claimed in claim 1 wherein said stabilizer is 1,1di-butyl-3-phenyl-1,3,3-trisiso-octyl-thioglycolate 1,3-distann-2-thiane.

8. The halogen-containing polymer stabilized against the deteriorative effect of heat as claimed in claim 1 wherein said stabilizer is 1,1-di-octyl-3-n-butyl-1,3,3-trisiso-octyl-thioglycolate 1,3-distann-2-thiane.

UNITED STATES PATENT OFFICE
CERTIFICATE OF CORRECTION

Patent No. 3,609,120          Dated 9/28/71

Inventor(s) PETER ALBERT THEODORE HOYE & DONALD ALBERT WOOD

It is certified that error appears in the above-identified patent and that said Letters Patent are hereby corrected as shown below:

On the title page immediately following "[73] Assignee, insert the following:

[32] Priority - February 23, 1968

[33] Great Britain

[31] 8896/68

UNITED STATES PATENT OFFICE
CERTIFICATE OF CORRECTION

Patent No. 3,609,120      Dated 9/28/71

Inventor(s) Peter A. T. Hoye and Donald A. Wood

It is certified that error appears in the above-identified patent and that said Letters Patent are hereby corrected as shown below:

Column 2, line 11, change "and" to --are--.

Column 2, line 43, change "trisnoylthioglycolate" to --trisnonylthioglycolate--.

Column 2, lines 52-53, change "trisiso-octylthioglycolate" to --amounts--.

Column 3, line 59, delete "will often be used as the only stabilizer in a polymeric vinyl", first occurrence.

Column 4, line 56, change "dibyryltin" to --dibutyltin--.

Column 6, line 24, change "thiocarbonxylic" to --thiocarboxylic--.

Column 6, line 44, delete "A".

Signed and sealed this 13th day of February 1973.

(SEAL)
Attest:

EDWARD M. FLETCHER, JR.            ROBERT GOTTSCHALK
Attesting Officer                  Commissioner of Patents

Notice of Adverse Decisions in Interferences

In Interference No. 98,003 involving Patent No. 3,609,120, P. A. T. Hoye and D. A. Wood, NOVEL CHEMICAL COMPOUNDS AND STABILIZED HALOGEN-CONTAINING RESINS, final judgment adverse to the patentees was rendered Aug. 30, 1973, as to claims 1, 2 and 3.

[*Official Gazette November 27, 1973.*]